(12) United States Patent
Cho et al.

(10) Patent No.: US 9,997,148 B2
(45) Date of Patent: Jun. 12, 2018

(54) APPARATUS AND METHOD OF SOUND MODULATION USING TOUCH SCREEN WITH PRESSURE SENSOR

(71) Applicant: INDUSTRY-ACADEMIC COOPERATION FOUNDATION, YONSEI UNIVERSITY, Seoul (KR)

(72) Inventors: Kwang Su Cho, Seoul (KR); Chang Kyu Choi, Seoul (KR); Choon Sung Nam, Seoul (KR); Min Gu Kang, Daegu (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days. days.

(21) Appl. No.: 15/297,010

(22) Filed: Oct. 18, 2016

(65) Prior Publication Data

US 2017/0110101 A1 Apr. 20, 2017

(30) Foreign Application Priority Data

Oct. 20, 2015 (KR) ........................ 10-2015-0145866

(51) Int. Cl.
*G10H 1/18* (2006.01)
*G10H 1/34* (2006.01)
(Continued)

(52) U.S. Cl.
CPC ............. *G10H 1/34* (2013.01); *G06F 3/0414* (2013.01); *G10H 1/182* (2013.01); *G10H 1/44* (2013.01);
(Continued)

(58) Field of Classification Search
CPC ............ G10H 1/34; G10H 1/182; G10H 1/44; G10H 1/46; G10H 2220/241;
(Continued)

(56) References Cited

U.S. PATENT DOCUMENTS 9,082,380 B1 * 7/2015 Hamilton ............... G10H 1/368
9,324,310 B2 * 4/2016 McPherson .............. G10H 1/02
(Continued)

FOREIGN PATENT DOCUMENTS

| JP | 2012-089150 A | 5/2012 |
| KR | 10-2013-0050251 A | 5/2013 |
| WO | WO 2015/048583 A1 | 4/2015 |

OTHER PUBLICATIONS

"Brute Force Technology: Zen Piano for iPhone "Senses" Tap Pressure, But Not by Magic", May 14, 2009, Create Digital Media, http://cdm.link/2009/05/brute-force-technology-zen-piano-for-iphone-senses-tap-pressure-but-not-by-magic/.

*Primary Examiner* — Jeffrey Donels

(57) ABSTRACT

Disclosed are an apparatus and a method of generating a sound by using a touch screen. A sound modulation apparatus according to the present invention includes: a sensor information input unit configured to receive sensing information on a position, at which a touch input of a user is applied to the screen, and pressure according to the touch input applied to the screen; and a sound modulation unit configured to set a tone frequency and volume of a sound to be output, and set the tone frequency according to the position, to which the touch input of the user is applied, and set the volume according to a size of the pressure according to the touch input.

19 Claims, 10 Drawing Sheets

US 9,997,148 B2

Page 2

(51) Int. Cl.
*G06F 3/041* (2006.01)
*G10H 1/46* (2006.01)
*G10H 1/44* (2006.01)

(52) U.S. Cl.
CPC ......... *G10H 1/46* (2013.01); *G10H 2220/241* (2013.01); *G10H 2220/271* (2013.01)

(58) Field of Classification Search
CPC ........... G10H 2220/271; G10H 1/0008; G10H 2220/096; G10H 2220/126; G06F 3/0414; G06F 3/041; G06F 3/04883; G06F 2203/04105
USPC .......................................................... 84/615
See application file for complete search history.

(56) References Cited

U.S. PATENT DOCUMENTS

| | | | |
|---|---|---|---|
| 9,620,095 B1* | 4/2017 | Hamilton | G10H 1/368 |
| 9,640,160 B2* | 5/2017 | Wang | G10H 1/34 |
| 9,666,173 B2* | 5/2017 | Lee | G10H 1/34 |
| 9,761,209 B2* | 9/2017 | Cook | G10H 1/0016 |
| 2006/0044280 A1 | 3/2006 | Huddleston et al. | |
| 2011/0134061 A1* | 6/2011 | Lim | G06F 3/016 |
| | | | 345/173 |
| 2011/0316793 A1* | 12/2011 | Fushiki | G06F 3/04886 |
| | | | 345/173 |
| 2012/0071994 A1* | 3/2012 | Lengeling | G06F 3/04886 |
| | | | 700/94 |
| 2012/0079410 A1* | 3/2012 | Adam | G06F 3/04886 |
| | | | 715/773 |
| 2013/0152767 A1* | 6/2013 | Katz | G10H 1/00 |
| | | | 84/616 |
| 2013/0318464 A1 | 11/2013 | Lengeling | |
| 2014/0083279 A1* | 3/2014 | Little | G10H 1/0008 |
| | | | 84/609 |
| 2016/0175718 A1* | 6/2016 | Yoo | A63F 13/814 |
| | | | 463/35 |

* cited by examiner

APPARATUS AND METHOD OF SOUND MODULATION USING TOUCH SCREEN WITH PRESSURE SENSOR

CROSS-REFERENCE TO RELATED APPLICATIONS

This application claims priority to and the benefit of Korean Patent Application No. 10-2015-0145866 filed in the Korean Intellectual Property Office on Oct. 20, 2015, the entire contents of which are incorporated herein by reference.

TECHNICAL FIELD

The present invention relates to an apparatus and a method of generating a sound by using a touch screen.

BACKGROUND ART

Various smart devices, such as a smart phone, or a tablet or wearable device, provided with a touch screen have been widely supplied and used, and various applications utilizing a touch screen input function of the smart device have been developed and used. Among the applications, a digital musical instrument application has been developed and used on a smart device.

However, the existing smart devices provided with a touch screen typically only detect whether a touch of a user is generated at a specific position on a screen and receive an input according to the detection, but cannot receive three-dimensional input information according to a depth of user's power pressing a screen, that is, input information including coordinates, at which a touch input of the user is received, and pressure information. In this respect, a musical instrument application executed in a smart device also has a problem in that it is impossible to implement various tones due to a limitation of the aforementioned received input information.

An electronic digital musical instrument, not an existing analog musical instrument, has been developed and used, but even in a case where a touch input is received, it ends to simply implement a percussion instrument using a touch pad, and the electronic digital musical instrument cannot provide a function of receiving and processing an input for implementing various tones by utilizing a touch screen.

RELATED ART LITERATURE (Patent Document 0001) Korean Patent No. 10-0644021 (Nov. 1, 2006)

SUMMARY OF THE INVENTION

The present invention has been made in an effort to provide an apparatus and a method of sound modulation, which determine the volume and a pitch of a sound according to a location, at which a touch input of a user is received, and a size of pressure applied by the touch input and a degree of change in the pressure and also control a frequency of the sound by using a pressure sensor provided in a touch screen and detecting and outputting the quantity of power pressing the screen according to a touch input of a user to implement a vibrato function.

The present invention has also been made in an effort to provide an apparatus and a method of sound modulation, which support a function of controlling a ratio of sounds output from a plurality of speakers according to a direction of an applied pressure in a touch input of a user or a movement of the direction on a screen.

An exemplary embodiment of the present invention provides a sound modulation apparatus, including: a sensor information input unit configured to receive sensing information on a position, at which a touch input of a user is applied to the screen, and pressure according to the touch input applied to the screen; and a sound modulation unit configured to set a tone frequency and volume of a sound to be output, and set the tone frequency according to the position, to which the touch input of the user is applied, and set the volume according to a size of the pressure according to the touch input.

The sound modulation apparatus may further include a pressure sensor unit configured to detect the position, at which the touch input of the user is applied to the screen, and detect and output the pressure according to the touch input.

The sound modulation apparatus may further include a screen configured to display an image.

The pressure sensor unit may include a sensing grid corresponding to a surface of the screen, detect and output the information on the position, at which the touch input of the user is applied on the screen, by using the sensing grid, and detect and output the information on the pressure at the position, to which the touch input of the user is applied, by using a pressure sensor provided in the sensing grid.

The sound modulation unit may include a volume controlling unit, which determines a reference pressure according to the pressure according to the touch input at a predetermined reference time, and set the volume according to a size of the determined reference pressure.

The volume controlling unit may determine the pressure according to the touch input at the reference time as the reference pressure, in which the reference time is a time point after a predetermined time based on a time point, at which the size of the pressure according to the touch input is increased to a predetermined size or more.

The volume controlling unit may determine the reference pressure by analyzing values of the pressures input during the predetermined reference time from a time point, at which a size of the pressure according to the touch input is increased to a predetermined size or more.

The sound modulation unit may include a setting unit, which analyzes the pressure input for each time according to the touch input based on a time point, at which a size of the pressure according to the touch input is increased to a predetermined size or more, and set the reference time.

The sound modulation unit may include a frequency controlling unit, which sets the tone frequency according to the position, to which the touch input is applied, and changes the tone frequency according to a change in a size of the pressure according to the touch input.

The frequency controlling unit may increase or decrease the tone frequency within a predetermined frequency range based on the set tone frequency according to the change in the size of the pressure according to the touch input.

The frequency controlling unit may repeatedly increase or the tone frequency over time, within a predetermined frequency range based on the set tone frequency, according to the change in the size of the pressure according to the touch input for vibrato of the sound to be output.

The frequency controlling unit may change the set tone frequency according to the change in the size of the pressure after a predetermined reference time.

When the size of the pressure is increased, the frequency controlling unit may increase the tone frequency to be higher than the set tone frequency, and when the size of the pressure is decreased, the frequency controlling unit may decrease the tone frequency to be lower than the set tone frequency.

The sound modulation unit may include a multi-channel output ratio controlling unit, which recognizes a direction of the touch input by using the position, to which the touch input is applied, or the pressure according to the touch input, and sets an output ratio between a plurality of channels, which are to output the sound, according to the recognized direction of the touch input.

The multi-channel output ratio controlling unit may recognize the direction of the touch input by using information about a change in the position, to which the touch input is applied, or a change in a size of the pressure at the position.

The multi-channel output ratio controlling unit may calculate a component value for each reference direction by analyzing the recognized direction of the touch input, and set an output ratio between the plurality of channels according to a predetermined setting value according to a size of the component value for each reference direction.

The multi-channel output ratio controlling unit may recognizes a direction of the touch input according to a direction of a movement of the position over time, to which the touch input is applied, according to a flow of time, or recognize a direction of the touch input according to a direction, in which a distribution of sizes of the pressures at a plurality of sensing points according to the touch input is changed over time.

Another exemplary embodiment of the present invention provides a sound modulation method, including: a pressure sensing operation of receiving information including a reference position, at which a touch input of a user is applied to a screen, and a reference pressure according to the touch input applied to the screen by using a pressure sensor; a volume setting operation of setting, by a sound modulation unit, a volume of a sound to be output according to a size of the pressure according to the touch input; and a frequency setting operation of setting, by the sound modulation unit, a tone frequency of the sound according to the position, to which the touch input is applied.

In the volume setting operation, a reference pressure may be determined according to the pressure according to the touch input at a predetermined reference time, and the volume may be set according to a size of the determined reference pressure.

In the frequency setting operation, the tone frequency may be set according to the position, to which the touch input is applied, and the tone frequency may be changed according to a change in a size of the pressure according to the touch input.

The sound modulation unit may further include a multi-channel output ratio controlling operation of recognizing a direction of the touch input by using the position, to which the touch input is applied, or the pressure according to the touch input, and setting an output ratio between a plurality of channels, which are to output the sound, according to the recognized direction of the touch input.

According to the apparatus and the method of sound modulation according to the present invention, it is possible to detect a position, an intensity, and a change in the intensity of a touch input of a user by using the touch screen including the pressure sensor, thereby controlling a pitch of a tone, a size of the tone, a change in a frequency, and the like according to the detection and output a sound.

According to the apparatus and the method of sound modulation according to the present invention, it is possible to control a sound outputting ratio between a plurality of speakers according to a touch input of a user.

According to the apparatus and the method of sound modulation according to the present invention, it is possible to implement a digital musical instrument function which is capable of outputting various tones by utilizing the sound output controlling function.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
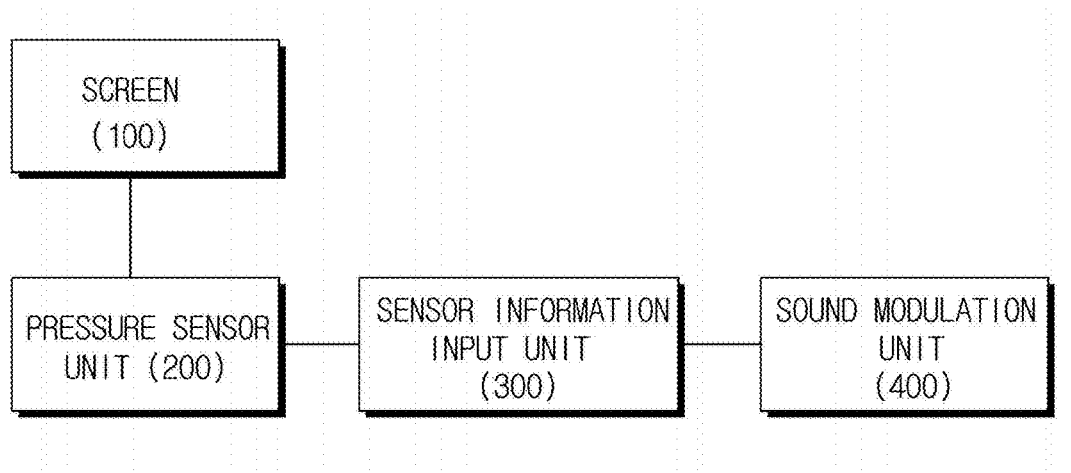
FIG. 1 is a block diagram of a sound modulation apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

Hereinafter, exemplary embodiments of the present invention will be described in detail with reference to the accompanying drawings. First, in adding reference numerals to constituent elements of each drawing, it should be noted that like reference numerals are used for like constituent elements even though the constituent elements are illustrated in different drawings. Further, in the following description of the present invention, a detailed description of publicly known configurations or functions incorporated herein will be omitted when it is determined that the detailed description may make the subject matter of the present invention unclear. Further, an exemplary embodiment of the present invention will be described below, but the technical spirit of the present invention is not limited thereto and may be modified and variously carried out by those skilled in the art.

Smart devices including existing touch screens typically detect existence of a touch of a user at a specific position on a screen and receive an input according to the detection of the touch. That is, an input method using the existing touch screen has a limitation in that it fails to receive three-dimensional input information according to a depth of user's power pressing a screen, that is, input information including coordinates, at which a touch input of the user is received, and pressure information. Accordingly, a musical instrument application executed in a smart device also has a limitation in that it is impossible to implement various tones due to a limitation of the aforementioned received input information. Further, an electronic digital musical instrument, not an existing analog musical instrument, has been developed and used, but the electronic digital musical instrument cannot provide a function of receiving an input for a touch screen and implementing various tones.

In this respect, the present invention has been made in an effort to provide an apparatus and a method of sound modulation, which determines the volume and a pitch of a sound, that is, a frequency, according to a location, at which a touch input of a user to a screen is received, and a size of pressure applied by the touch input and a degree of change in the pressure and also controls a frequency of the sound by using a pressure sensor detecting and outputting the quantity of power pressing the screen according to a touch input of a user to adjust the frequency of a tone and implement a vibrato function. Further, the present invention has been made in an effort to provide an apparatus and a method of sound modulation, which support a function of controlling a ratio of sounds output from a plurality of speakers according to a direction of an applied pressure in a touch input of a user or a movement of the direction on a screen.

FIG. 1 is a block diagram of a sound modulation apparatus according to an exemplary embodiment of the present invention.

The sound modulation apparatus according to the present invention may include a sensor information input unit 300 and a sound modulation unit 400, and may also further include a pressure sensor unit 200 or a screen 100 as necessary.

Here, the sound modulation apparatus according to the present invention may also be implemented as a computer program including a program module of which a part or all of constituent elements are selectively combined to perform a part or all of functions combined in one or a plurality of hardware. Further, as necessary, each of the constituent elements may be implemented as one independent hardware or may also be included in each hardware. Further, the sound modulation apparatus according to the present invention may be implemented as a software program and operated on a processor or a signal processing module, or may be implemented in a form of hardware and included in various processors, chips, semiconductors, devices, and the like. Further, the sound modulation apparatus according to the present invention may be included in a form of a hardware or software module on various embedded systems or devices provided with screens and connected with speakers and operated. The sound modulation apparatus according to the present invention may be implemented in a mobile device, such as a smart phone and a tablet electronic device, provided with a touch screen, or a digital musical instrument device provided with a touch screen, or may be included therein.

The screen 100 displays an image. Here, the screen 100 receives an electric signal representing an image, and outputs the received electric signal as each light in a plurality of pixels arranged on a two-dimensional plane to display a two-dimensional image. Preferably, the screen 100 may be a touch screen which recognizes and outputs a touch position when a user touches the screen 10 in connection with the pressure sensor unit 100 which will be descried below.

The pressure sensor unit 200 detects a position on the screen 100 to which the touch input is applied, and detects and outputs a pressure according to the touch input. Here, the pressure sensor unit 200 detects and outputs a pressure applied to the screen 100 according to a touch input of the user at a predetermined position on the screen 100. Here, the detection and the output of the pressure may mean the detection and the output of a size of the applied pressure. Further, the predetermined position herein may mean a predetermined position in a region including all of the positions, at which when the user touches a specific position on the screen 100, it is possible to detect and output a pressure according to the touch.

The sensor information input unit 300 receives sensing information regarding a position on the screen 100, to which a touch input of the user is applied, and a pressure according to the touch input applied to the screen 100. Here, the sensor information input unit 300 may be connected with the pressure sensor unit 200 and receive the sensing information. Here, the sensor information input unit 300 may be implemented in a form of a connection of various physical ports or pins, a form of a circuit connection within hardware, or a form of reading stored sensing information when the sensing information is stored in a storage device, a memory, or the like. Herein, the sensor information input unit 300 may also be implemented by other various schemes for receiving information detected by the pressure sensor unit 200.

The sound modulation unit 400 sets a tone frequency and a volume of a sound to be output, and sets the tone frequency according to a position, to which the touch input is applied, and sets the volume according to a size of pressure according to the touch input.

A sound signal generating unit 500 may generate a sound signal that is an electric signal representing a sound according to the tone frequency and the volume set by the sound modulation unit 400, and the generated sound signal may be input to the speaker 600 and output as a physical sound.

Figure 2:
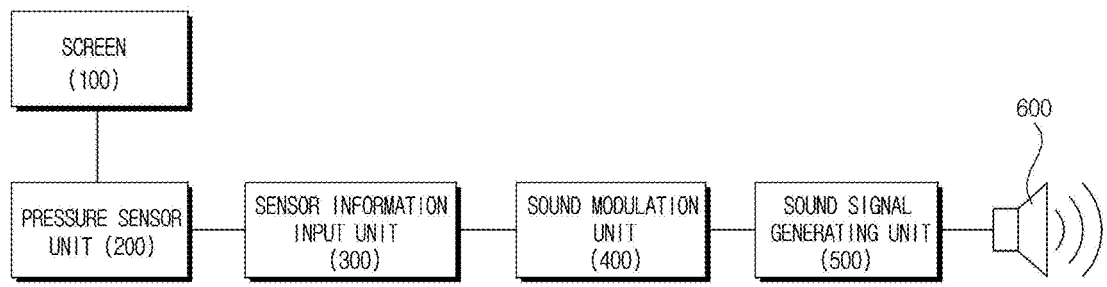
FIG. 2 is a block diagram of a sound modulation apparatus according to another exemplary embodiment of the present invention.

FIG. 2 is a block diagram of the sound modulation apparatus according to the present invention, in which the sound signal generating unit 500 and the speaker 600 are included.

Figure 3:
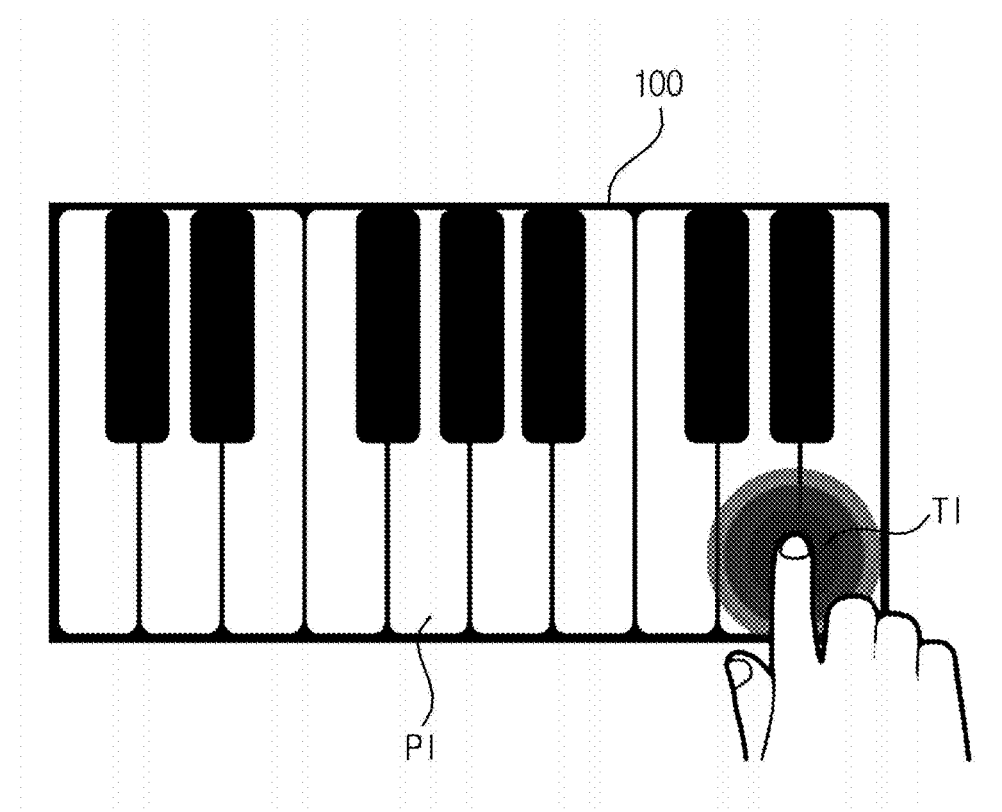
FIG. 3 is a reference diagram for describing a scheme of operating the sound modulation apparatus according to the present invention.

FIG. 3 is a reference diagram for describing a scheme of operating the sound modulation apparatus according to the present invention.

As illustrated in FIG. 3, a piano keyboard image PI may be displayed on the screen 100, and the pressure sensor unit 200 connected to the screen 100 may detect a touch input TI of a user to the screen 100, on which the piano keyboard image is displayed, and output a position, to which the touch input is applied, and a pressure at the corresponding position. In this case, the sound modulation unit 400 may determine the kind of key at the position, to which the touch input is applied, by using pre-recognized information about the keyboard image displayed on the screen 100. That is, the sound modulation unit 400 may set a tone frequency according to the position, to which the touch input is applied. Further, the sound modulation unit 400 may recognize a degree of intensity of the press of the corresponding key according to a size of pressure according to the touch input, and thus may determine a size of volume of a tone corresponding to the corresponding key to be output. That is, the sound modulation unit 400 may set the volume according to a size of the pressure according to the touch input.

Here, the pressure sensor unit 200 may include a sensing grid corresponding to a surface of the screen 100.

In this case, the pressure sensor unit 200 may detect and output information on the position on the screen 100, to which the touch input is applied, by using the sensing grid. Further, the pressure sensor unit 200 may detect and output information on the pressure at the position, to which the touch input is applied, by using the pressure sensor provided in the sensing grid.

Here, the location on the position may be information on coordinates on the screen 100 to which the touch input is applied. In this case, the sound modulation unit 400 may obtain the information on the position on the screen 100, to which the touch input is applied, sensed by the pressure sensor unit 200 through the sensor information input unit 300, and may use the size of the pressure according to the touch input and the coordinate information about the touch input.

For example, when an x-y coordinate system is set based on a left and lower end of the screen 100 as a reference point, when it is assumed that a user applies power of 2N at a point of coordinates x=50 mm, y=100 mm, the pressure sensor unit 200 may detect and output position information and pressure information about the touch input of the user, and the sensor information input unit 300 may receive the information from the pressure sensor unit 200 and information informing that the pressure of 2N is applied at the point of (50 mm, 100 mm).

Here, the user may press the screen 100 with different pressing intensities, and the pressure sensor unit 200 may recognize the intensity of the touch input of the user and detect and output the pressure applied onto the screen. For example, the user may weakly press the screen 100, and in this case, the intensity of the press of the screen 100 by the user may be an intensity with which the user lightly puts his/her finger on the screen 100. Otherwise, the user may press the screen 100 with an intermediate intensity, and in this case, the intensity of the press of the screen 100 by the user may be an intensity with which the user generally makes a touch input when using a smart phone or a tablet electronic device. Otherwise, the user may press the screen 100 with a high intensity, and in this case, the intensity of the press of the screen 100 by the user may be an intensity with which the user intentionally and strongly presses the screen 100. As described above, the user may intentionally press the screen 100 with different intensities and apply a pressure, and thus, a size of the pressure is continuously changed. Accordingly, the pressure sensor unit 200 may detect the size of the pressure and output the detected size of the pressure in a form of an electric signal, and the sensor information input unit 300 may receive the size of the pressure. In this case, the detected size of the pressure may be converted from an analog signal to a digital signal, and an ADC device for the conversion may be included in the pressure sensor unit 200 or the sensor information input unit 300 as necessary.

Hereinafter, an operation of the sound modulation unit 400 will be described in more detail.

The sound modulation unit 400 may include at least one of the volume controlling unit 410 and the frequency controlling unit 420, and may also further include the multi-channel output ratio controlling unit 430 as necessary.

Figure 4:
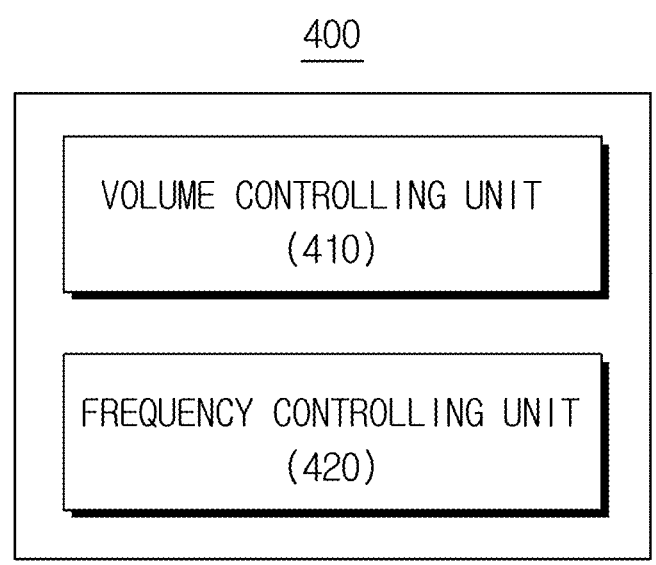
FIG. 4 is a detailed block diagram of a sound modulation unit 400.
Figure 9:
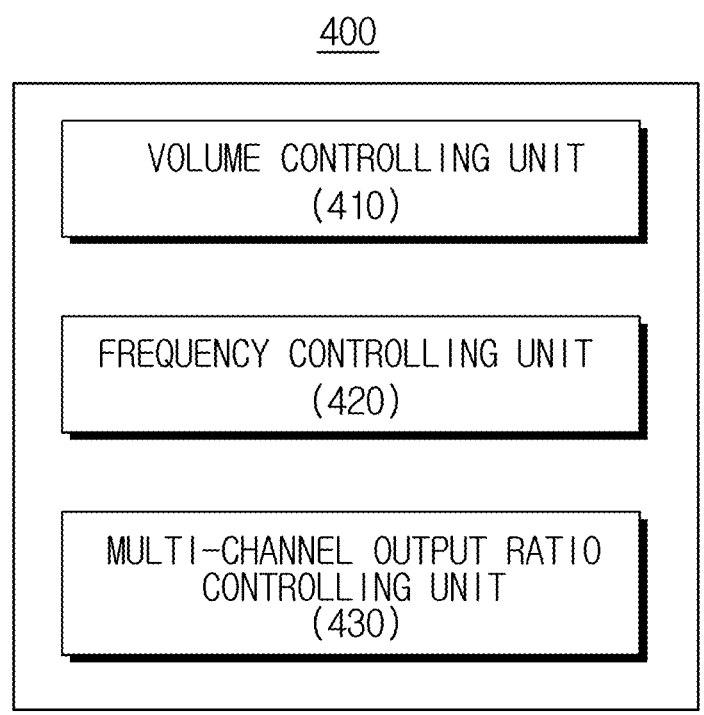
FIG. 9 is a detailed block diagram of a sound modulation unit 400.

FIGS. 4 and 9 are detailed block diagrams illustrating an exemplary embodiment of the sound modulation unit 40.

First, the volume controlling unit 410 may set the volume according to the size of the pressure according to the touch input.

Figure 5A:
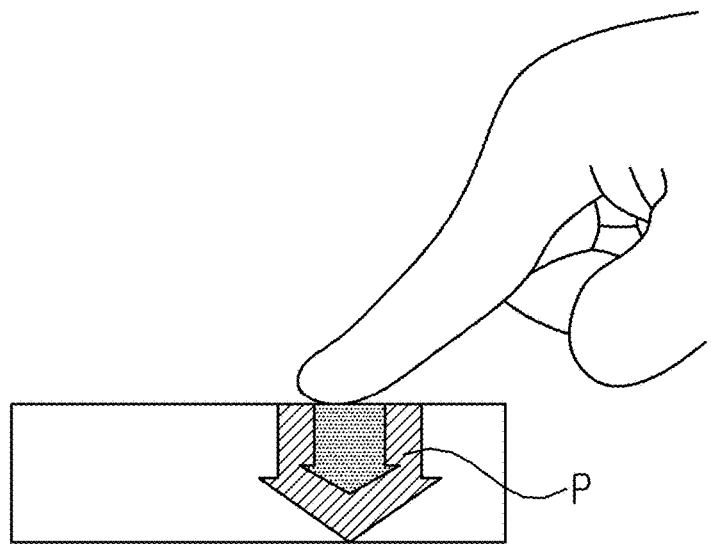
FIGS. 5A and 5B are a reference diagram for describing an operation of a volume controlling unit 410.
Figure 5B:
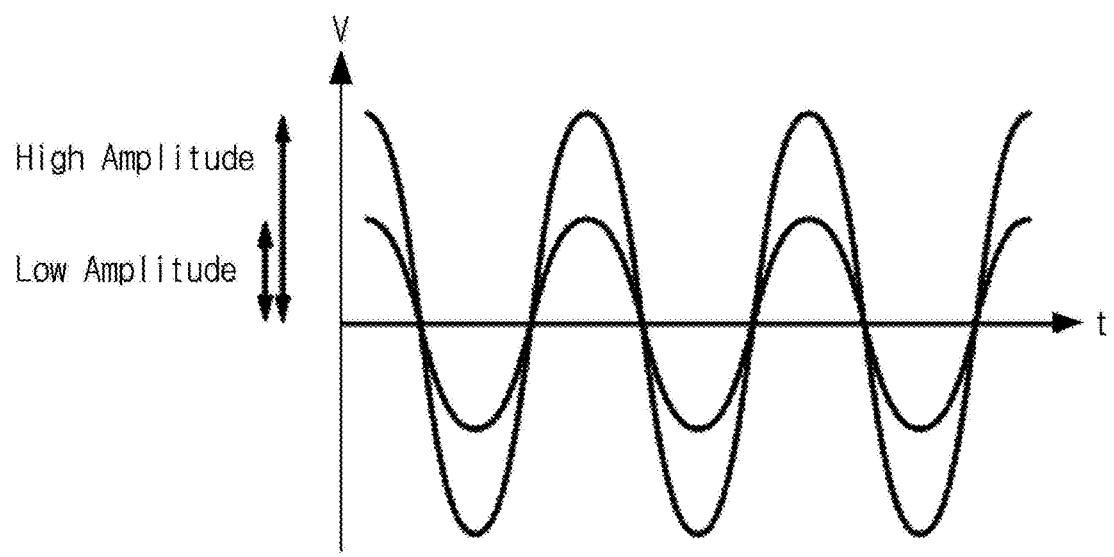

FIG. 5 is a reference diagram for describing an operation of the volume controlling unit 410.

Here, the volume controlling unit 410 may determine a reference pressure according to a pressure P according to the touch input at a predetermined reference time, and set the volume V according to a size of the determined reference pressure.

Here, the reference pressure means the pressure which the volume controlling unit 410 recognizes for the touch input of the user, and the volume controlling unit 410 may obtain a volume value by using a table, in which a size of volume is predetermined according to a size of reference pressure or a predetermined function, in which a size of reference pressure is an input.

Figure 6:
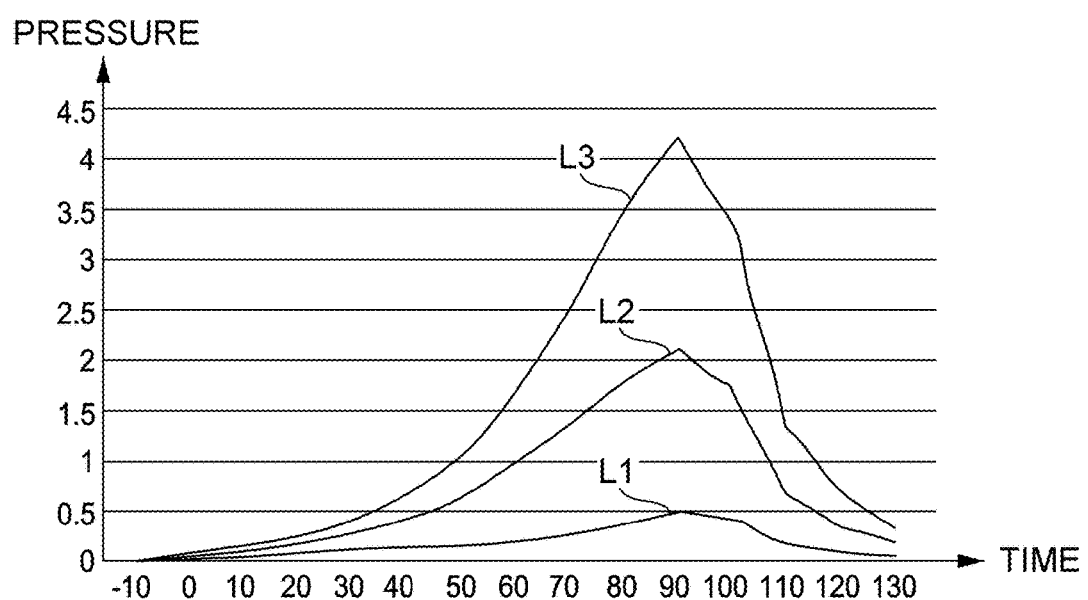
FIG. 6 is a reference diagram for describing a reference time.

FIG. 6 is a reference diagram for describing the reference time. Here, the reference time means predetermined time information for determining a pressure representing an intention of the user among the pressures with different sizes.

Power of the user generally applied to the screen 100 when the user makes a touch input to the screen 100 starts to increase from a time point at which the touch of the user to the screen 100 begins, passes a peak point, and then is decreased until the touch of the user to the screen 100 is released. FIG. 6 is a graph representing a change of power applied to the screen 100 according to the touch input of the user according to a flow of time. Here, the graph of FIG. 6 represents changes L1, L2, and L3 of applied power according to touch inputs of different intensities as an example. Further, a size of pressure, which the pressure sensor unit 200 detects and outputs according to the touch input of the user, also exhibits the similar pattern to that of FIG. 6.

Accordingly, the volume controlling unit 410 needs to recognize a pressure representing an intention of the user among the pressures with different sizes, which are input to the sensor information input unit 300 according to a flow of time, and select volume corresponding to the corresponding pressure. To this end, the volume controlling unit 410 may set a reference time and determine a reference pressure by the pressure input to the sensor information input unit 300 at a time point corresponding to the reference time.

Here, the volume controlling unit 410 may determine a reference pressure according to the pressure input at a predetermined reference time from a time point, at which the pressure with a predetermined size or more starts to be input to the sensor information input unit 300 according to the touch input of the user to the screen 100, and set volume according to the determined reference pressure. Here, the time point, at which the pressure with the predetermined size or more starts to be input to the sensor information input unit 300, may represent a time point, at which the user touches the screen 100 for a touch input, or a time point from a corresponding time point within a predetermined time. Here, the predetermined size may set to a size of pressure which is basically generated when the user touches the screen 100. For example, the predetermined size may be 0.1N.

Here, the reference time may be set to a specific time point or a specific time section based on the time point, at which the pressure with the predetermined size or more starts to be input to the sensor information input unit 300.

Here, the volume controlling unit 410 may determine the pressure at the reference time set to the specific time point as a reference pressure, and set volume according to the determined reference pressure.

Here, the volume controlling unit 410 may determine a pressure according to the touch input at the reference time as the reference pressure, in which a time point after a predetermined time based on a time point, at which the size of the pressure according to the touch input is increased to a predetermined size or more, is the reference time.

For example, when the reference time is set with the specific time point, the volume controlling unit 410 may determine a pressure input to the sensor information input unit 300 at the corresponding specific time point as a reference pressure. For example, when the reference time is set with 100 ms, the volume controlling unit 410 may determine a pressure input at a time point elapsed by 100 ms from the time point, at which a pressure having a predetermined size or more starts to be input to the sensor information input unit 300, as a reference pressure.

Otherwise, the volume controlling unit 410 may analyze pressures at the reference time set with a specific time section, determine a reference pressure, and set volume according to the determined reference pressure. Here, the volume controlling unit 410 may analyze the input pressure values during the predetermined reference time from a time point, at which the size of the pressure according to the touch input is increased to a predetermined size or more and determine a reference pressure, and for example, the volume controlling unit 410 may fine a maximum value of the pressure or calculate an average value to determine a reference pressure.

For example, the volume controlling unit 410 may determine the recognized pressure by calculating an average value of the pressure input during the corresponding time section or finding a maximum value of the pressure input during a corresponding time section. For example, when the reference time is set with 70 ms to 120 ms, the volume controlling unit 410 may determine a reference pressure by using sizes of pressures input from a time point after 70 ms is passed from a time point, at which a pressure having a predetermined size or more starts to be input to the sensor information input unit 300, to a time point elapsed by 120 ms.

FIG. 6 is a reference diagram for describing a preferred setting value of the reference time. Here, L1, L2, and L3 represent graphs showing an increase and decrease of pressures when the user applies power with intended intensities with different sizes, respectively. Referring to FIG. 6, it can be seen that power applied to the screen 100 according to a touch input of the user starts to sharply increase at about 40 to 50 ms, shows a peak at about 80 to 100 ms, and then the decrease of the size of the power is ended at about 110 to 120 ms. Considering the result of the experiment, the reference time may be set with a time section or a specific time at a time of 50 ms to 150 ms based on the time point, at which the pressure having the predetermined size or more starts to be input from the pressure sensor unit 200 to the sensor information input unit 300. Further, more preferably, the reference time may be set with a time of 70 ms to 110 ms.

In this case, the reference time may also be set in a section of 0 ms to 150 ms as necessary, and may also be set with various time sections or time points as necessary.

Here, there is an effect in that when the volume controlling unit 410 determines the reference pressure by analyzing a change in the size of the pressure input during the reference time section, it is possible to accurately recognize the size of the pressure intended by the user. To this end, the volume controlling unit 410 may store the size of the pressure input from the pressure sensor unit 200 to the sensor information input unit 300 according to a flow of time for each time, and analyze the stored pressures. However, when the volume controlling unit 410 analyzes the pressure values during a predetermined time section, a memory may be consumed and power for processing a signal may be consumed, so that in order to save the memory and the power, the pre-defined specific time point may also be set as the reference time. When the specific time point is set as the reference time, it is possible to determine a reference pressure by using only the pressure input during the corresponding reference time, so that there is an effect in that it is possible to save a memory and minimize power consumed for processing a signal.

The sound modulation unit 400 may also further include a setting unit for setting the reference time as necessary.

In this case, the setting unit may set the reference time by analyzing a pressure input for each time according to the touch input based on a time point, at which the size of the pressure according to the touch input is increased to a predetermined size or more.

The setting unit may set the most appropriate reference time according to an input of the user for each user in order to determine a reference pressure. In this case, the setting unit may analyze the pressure input for each time according to the touch input based on a time point, at which the pressure having the predetermined size or more according to the touch input of the user to the screen 100 starts to be input, and set the reference time. Here, the setting unit may set the reference time based on a time, at which the pressure has a maximum value, during a predetermined time from the time point, at which the pressure having the predetermined size or more starts to be input to the sensor information input unit 300. Here, the predetermined time is a time section set for observing a change in the size of the pressure output by the pressure sensor unit 200 according to the touch input of the user, and a length of the predetermined time may be set as necessary. For example, the predetermined time may be set with 300 ms. Further, the setting unit may set the largest point of the pressure input to the sensor information input unit 300 during the predetermined time as the reference time. Otherwise, the setting unit may also set a predetermined time section based on the highest point of the pressure as the reference time.

Next, an operation of the frequency controlling unit 420 will be described in more detail.

The frequency controlling unit 420 may set the tone frequency according to a position, to which the touch input is applied. For example, a tone may be predetermined for each portion of an image according to the image displayed on the screen 10, and in order to output a tone according to a portion of the screen 100 which the user touches, frequency controlling unit 420 included in the sound modulation unit 400 may set a tone frequency according to the position, to which the touch input is applied. Further, different tones may be generated according to the set tone frequency.

Here, the frequency controlling unit 420 may set the tone frequency according to the position, to which the touch input is applied, and change the tone frequency according to a change in a size of the pressure according to the touch input. For example, the user may want to control a pitch of a tone according to a movement or a manipulation of a hand, like an analog musical instrument, while outputting a tone corresponding to a corresponding portion by touching a specific portion displayed on the screen 100 in order to output a specific tone. That is, the user may want to perform vibrato by changing a pitch of a tone within a predetermined range or perform a phenomenon, in which a pitch moves in a specific direction. In order to implement the aforementioned functions, the frequency controlling unit 420 according to the present invention changes a tone frequency according to a change in a size of pressure according to a touch input.

Figure 7A:
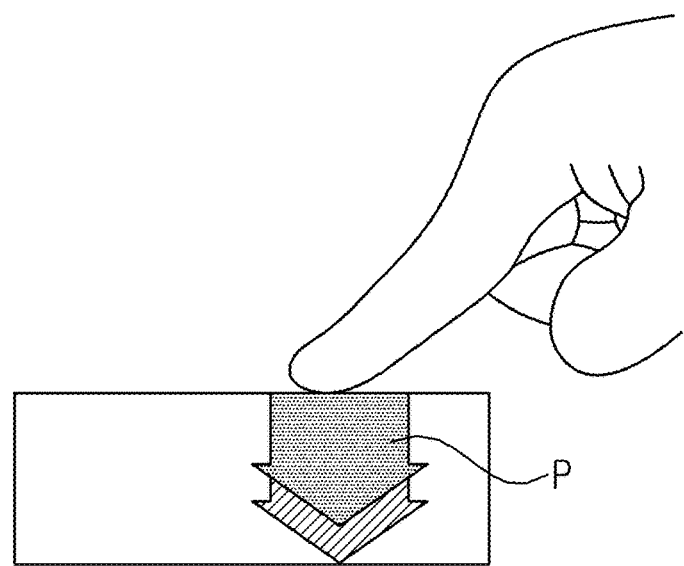
FIGS. 7A and 7B are a reference diagram for describing an operation of a frequency controlling unit 420.
Figure 7B:
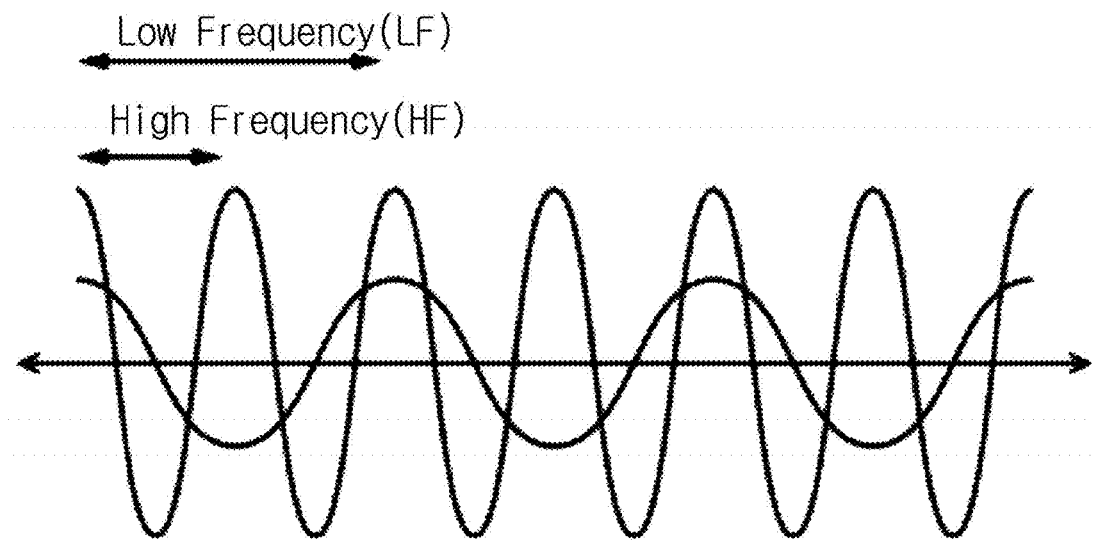

FIG. 7 is a reference diagram for describing an operation of the frequency controlling unit 420.

Referring to FIG. 7, when a pressure P applied to the screen 100 by the user is changed, the pressure sensor unit 200 may detect a change in the pressure according to a touch input according to a flow of time, and the sensor information input unit 300 may receive the changed pressure, and the frequency controlling unit 420 may control a tone frequency according to a size of the changed pressure. For example, when a size of the pressure P is increased as illustrated in FIG. 7, the frequency controlling unit 420 may control a tone frequency to a higher frequency HF, and when a size of the pressure P is decreased, the frequency controlling unit 420 may control a tone frequency to a low frequency LF.

Here, the frequency controlling unit 420 may increase or decrease the tone frequency within a predetermined frequency range based on the set tone frequency according to a change in the size of the pressure according to the touch input. That is, in the control of the tone frequency, the frequency controlling unit 420 may control a tone frequency F2 within a predetermined frequency range ±f based on a tone frequency F1 which is primarily set according to a position, to which the touch input is applied (F1−f<F2<F1+f). Here, the predetermined frequency range may be set as necessary.

Here, the frequency controlling unit 420 may repeatedly increase or decrease the tone frequency within a predetermined frequency range based on the set tone frequency according to a flow of time according to the change in the size of the pressure according to the touch input for vibrato of the sound to be output. A pitch of a tone is periodically changed within a predetermined time within a predetermined range based on a pitch of a specific tone, so that vibrato implemented in a musical instrument is generated, and in order to generate the vibrato, the frequency controlling unit 420 according to the present invention may repeatedly increase and decrease the tone frequency F2 within the predetermined frequency range ±f based on the primarily set tone frequency F1 according to the position, to which the touch input is applied, according to a flow of time (F1−f<F2<F1+f). For example, the frequency controlling unit 420 may repeatedly increase and decrease a tone frequency by N times per one second within the frequency range.

Here, the frequency controlling unit 420 may change the set tone frequency according to the change in the size of the pressure after the predetermined reference time. The frequency controlling unit 420 may control a tone frequency according to a change in a pressure applied by the touch input of the user after a tone and volume of a sound are determined. Accordingly, the frequency controlling unit 420 may change a tone frequency according to the change in the size of the pressure after the reference time that is a determination time of the volume. In this case, the user may output a specific tone by touching a specific portion of the screen 100, and then control a size of pressing power while continuously touching the corresponding portion to change a frequency of the output tone.

Here, when the size of the pressure is increased, the frequency controlling unit 420 may increase the tone frequency to be higher than the set tone frequency, and when the size of the pressure is decreased, the frequency controlling unit 420 may decrease the tone frequency to be lower than the set tone frequency. Here, a direction of the change in the size of the pressure and a direction of the change in the tone frequency may also be set to be contrary to each other as necessary.

Next, an operation of the multi-channel output ratio controlling unit 430 will be described in more detail.

The sound modulation apparatus according to the present invention may support a plurality of speakers. In this case, the multi-channel output ratio controlling unit 430 may control an output ratio between the channels connected to the respective speakers according to the touch input of the user. For example, when a stereo speaker is connected to the sound modulation apparatus according to the present invention, the multi-channel output ratio controlling unit 430 may control an output ratio of both speakers from a basic ratio of 5:5 to various ratios, such as 6:4 and 7:3, according to the touch input of the user.

Figure 8:
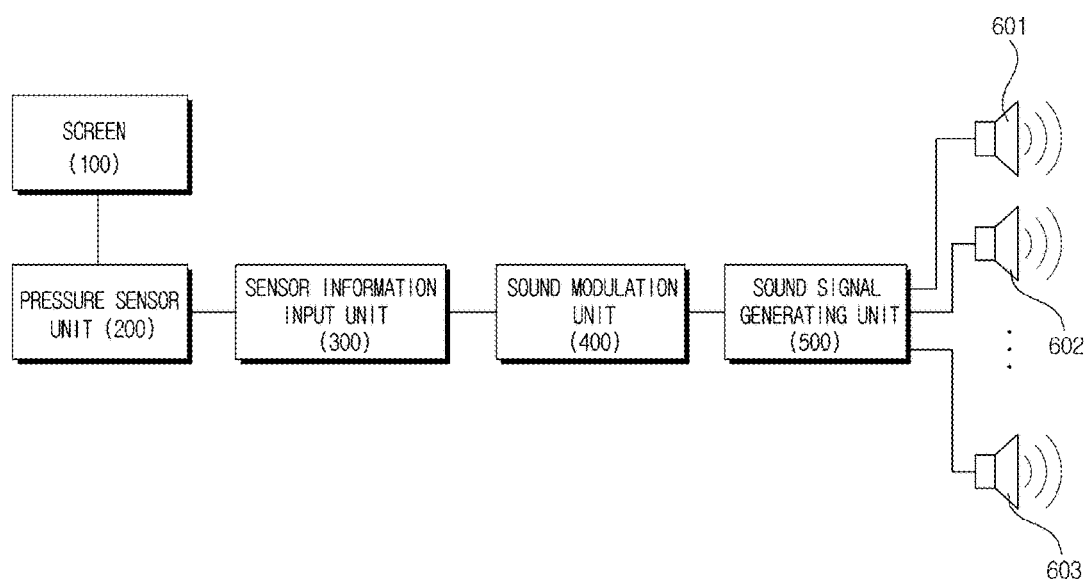
FIG. 8 is a block diagram of the sound modulation apparatus according to the present invention supporting the plurality of speakers 601, 602, and 603.

FIG. 8 is a block diagram of the sound modulation apparatus according to the present invention supporting the plurality of speakers 601, 602, and 603.

FIG. 9 is a detailed block diagram of the sound modulation unit 400 when the multi-channel output ratio controlling unit 430 is further included.

The multi-channel output ratio controlling unit 430 may recognize a direction of the touch input by using the position, to which the touch input is applied, or the pressure according to the touch input, and set an output ratio between the plurality of channels, which are to output the sound, according to the recognized direction of the touch input.

Here, the direction of the touch input may mean a direction, in which the user applies power in a touch portion of the screen 100, or a movement direction of the touch portion on the screen 100.

Figure 10A:
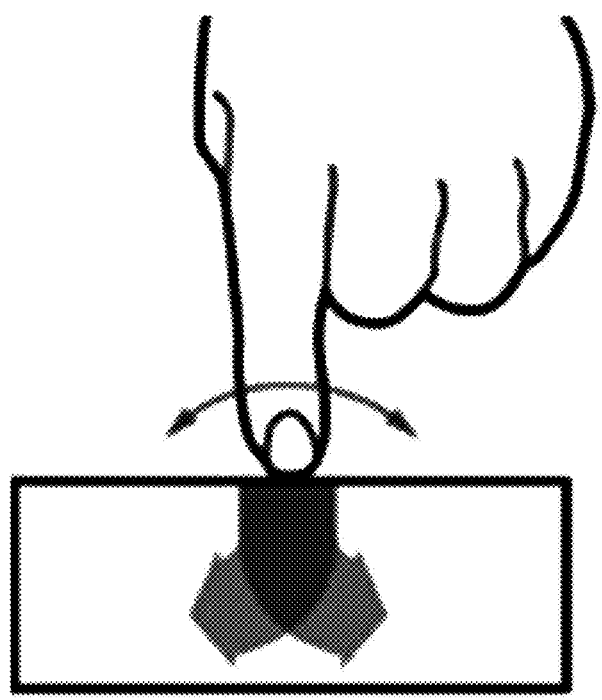
FIGS. 10A and 10B are a reference diagram for describing an operation of a multi-channel output ratio controlling unit 430.
Figure 10B:
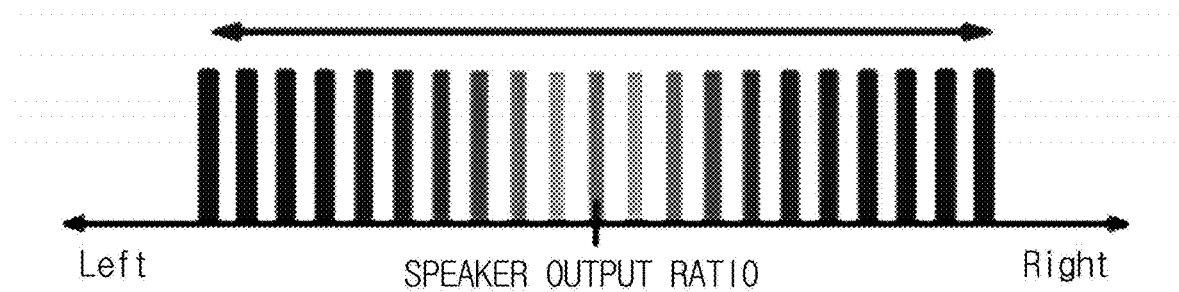

FIG. 10 is a reference diagram for describing an operation of the multi-channel output ratio controlling unit 430.

As illustrated in FIG. 10, the user may change directions D1 and D2 of the touch input by switching a direction of the press by a finger right and left or moving a finger right and left on the screen 100. The multi-channel output ratio controlling unit 430 may recognize the touch input direction of the user and thus control an output ratio of the left and right speakers.

Here, the multi-channel output ratio controlling unit 430 may recognize the direction of the touch input by using information about the change in the position, to which the touch input is applied, or the change in the size of the pressure at the position.

Here, the multi-channel output ratio controlling unit 430 may recognize the direction of the touch input according to a direction of a movement of the position, to which the touch input is applied, according to a flow of time. A position of a contact point with the screen 100 according to the touch input of the user may move in a specific direction on the screen 100, and the multi-channel output ratio controlling unit 430 may recognize a movement direction of the contact point as the direction of the touch input. To this end, the multi-channel output ratio controlling unit 430 may measure a change in the position, to which the touch input is applied, calculate a direction, in which the position is changed, and recognize the calculated direction as the direction of the touch input.

Otherwise, the multi-channel output ratio controlling unit 430 may also recognize a direction of the touch input according to a direction, in which a distribution of the pressure sizes is changed according to a flow of time at a plurality of sensing points according to the touch input. The contact point with the screen 100 according to the touch input of the user may have a predetermined area, and in this case, the pressure sensor unit 200 may detect a pressure of each of the plurality of pressure sensors in a sensing grid. When the user makes a change, in which power is applied in a specific direction, or only finely moves the contact point in a state where the user does not moves the contact point of the touch input, the multi-channel output ratio controlling unit 430 may recognize the specific direction, in which the use applies power, or a direction, in which the user finely moves the contact point by analyzing a distribution of sizes of pressures in the plurality of pressure sensors on the sensing grid. According to the aforementioned principle, the multi-channel output ratio controlling unit 430 may recognize a direction of the touch input according to a direction, in which the distribution of the sizes of the pressure at the plurality of sensing points is changed.

For example, when the pressures in the respective pressure sensors located at three points of (−1, 0), (0, 0), and (1, 0) on reference coordinates on the 2D sensing grid have a distribution of 5N, 5N, and 5N, respectively, and the distribution is changed to 1N, 5N, and 9N, the multi-channel output ratio controlling unit 430 may recognize information indicating that the direction of the application of the power by the user at the contact point on the screen 100 is leaned in a positive X-axis direction. In this case, the multi-channel output ratio controlling unit 430 may recognize that the direction of the touch input is the positive X-axis direction.

Here, the multi-channel output ratio controlling unit 430 may calculate a component value for each reference direction by analyzing the recognized direction of the touch input, and set an output ratio between the plurality of channels according to a predetermined setting value according to a size of the component value for each reference direction. Here, the reference direction may be predetermined 2D coordinates (X, Y) on the screen 100, and the direction of the touch input on the screen 100 may be decomposed into each component value in the X-axis direction and a Y-axis direction. Here, the multi-channel output ratio controlling unit 430 may set an output ratio between the channels according to the component value decomposed in each axial direction. Here, the output ratio between the channels according to the component value may also be obtained by using a predetermined table, or calculated by using a predetermined function, in which the component value is an input.

Here, the multi-channel output ratio controlling unit 430 may recognize a direction of the touch input after a predetermined reference, and set an output ratio between the channels according to the recognized direction of the touch input. The multi-channel output ratio controlling unit 430 may control an output ratio between the channels according to the direction of the touch input after a tone and volume of a sound are determined. Accordingly, the multi-channel output ratio controlling unit 430 may control an output ratio between the channels according to the direction of the touch input of the user after the reference time that is the time in which the volume is determined. In this case, the user may output a specific tone by touching a specific portion of the screen 100, and then control an output ratio of the sounds between the speakers by controlling the touch direction. Accordingly, the user may change impression of space of the sound by changing a direction, in which the sound is output, according to a direction or a movement direction of power of the finger pressing the screen 100. For example, in a case of a stereo speaker (headphone) of which the left and the right are discriminated, a ratio of the sounds output from both speakers is changed according to a direction or a movement direction of power of the finger in a state where the user presses the screen 100, and when the power of the finger is applied in the left direction in a case where the sounds are basically output with the same volume in the ratio of 5:5 for the left speaker and the right speaker, the ratio of the volume may be changed to 6:4 or 7:3. Contrary to this, when the power is applied in the right direction, the ratio of the volume may be changed to 4:6 or 3:7. As described above, the ratio of the volume output from the respective speakers is changed according to the direction and a speed of the movement of the finger, thereby providing a feeling as if the sound moves.

Figure 11:
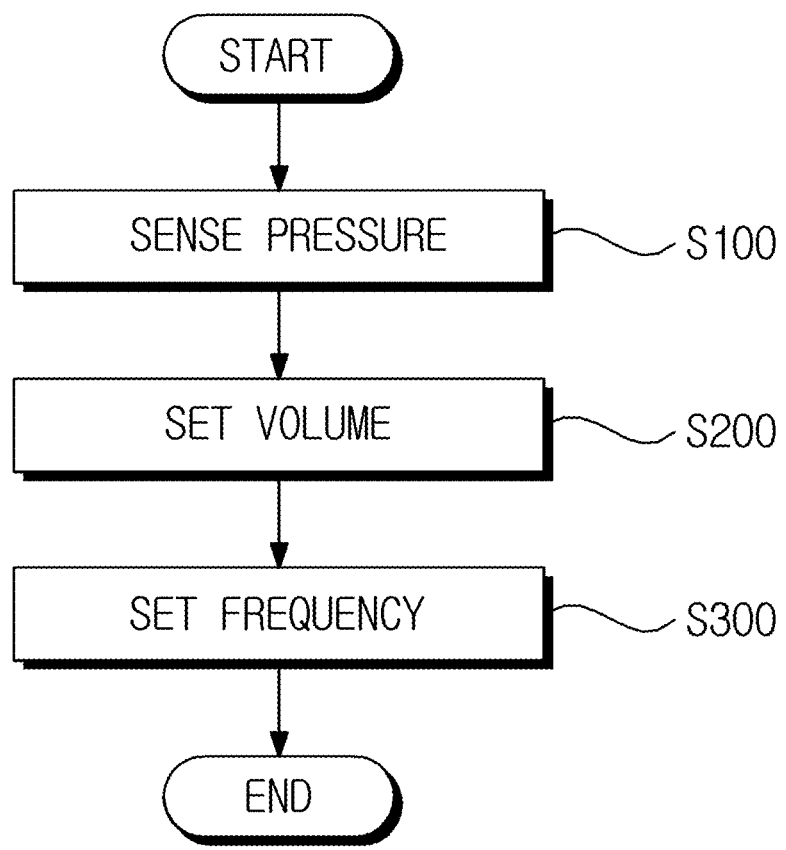
FIG. 11 is a flowchart of a sound modulation method according to yet another exemplary embodiment of the present invention.

FIG. 11 is a flowchart of a sound modulation method according to another exemplary embodiment of the present invention.

The sound modulation method according to another exemplary embodiment of the present invention may include a pressure sensing operation S100, a volume setting operation S200, and a frequency setting operation S300. Further, the sound modulation method according to the present invention may further include a multi-channel output ratio setting operation S400 as necessary, and may also further include a sound signal generating operation S500. Here, the sound modulation method according to the present invention may be operated in the identical scheme to that of the operation of the sound modulation apparatus which has been described in detail with reference to FIGS. 1 to 10. Accordingly, the overlapping description will be omitted, and the sound modulation method according to the present invention will be briefly described.

Figure 12:
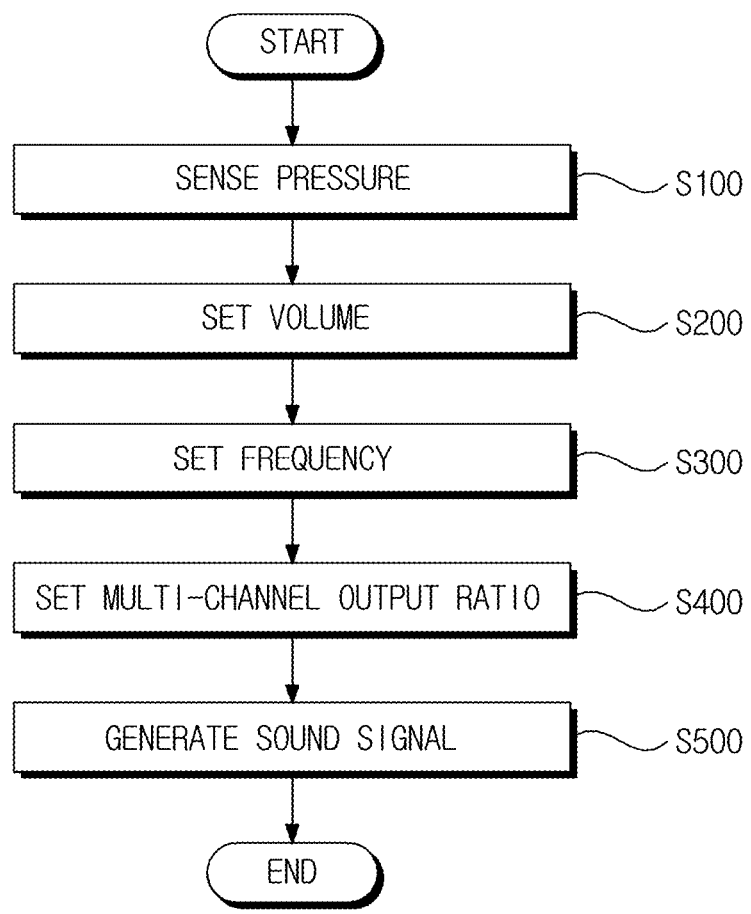
FIG. 12 is a flowchart of a sound modulation method according to still yet another exemplary embodiment of the present invention.

FIG. 12 is a flowchart of the sound modulation method according to the aforementioned case.

In the pressure sensing operation S100, information including a detected position, at which a touch input of a user is applied to the screen 100, and a detected pressure according to the touch input applied to the screen 100 is received by using the pressure sensor.

In the volume setting operation S200, the sound modulation unit 400 sets volume of a sound to be output according to a size of the pressure according to the touch input.

Here, in the volume setting operation S200, a reference pressure may be determined according to the pressure according to the touch input at a predetermined reference time, and the volume may be set according to a size of the determined reference pressure.

In the frequency setting operation S300, the sound modulation unit 400 sets a tone frequency of the sound according to the position, to which the touch input is applied.

Here, in the frequency setting operation S300, the tone frequency may be set according to the position, to which the touch input is applied, and the tone frequency may be changed according to a change in the size of the pressure according to the touch input.

In the multi-channel output ratio controlling operation S400, the sound modulation unit 400 recognizes a direction of the touch input by using the position, to which the touch input is applied, or the pressure according to the touch input, and sets an output ratio between the plurality of channels, which are to output the sound, according to the recognized direction of the touch input.

In the meantime, even if it is described that all of the constituent elements constituting the aforementioned exemplary embodiment of the present invention are coupled as a single unit or coupled to be operated, the present invention is not necessarily limited to the exemplary embodiment. That is, among the components, one or more constituent elements may be selectively coupled to be operated within the scope of the object of the present invention.

Although each of the constituent elements may be implemented as an independent hardware, some or all of the constituent elements may be selectively combined with each other, so that they can be implemented as a computer program having a program module for executing some or all of the functions combined in one or a plurality of hardware. Further, such a computer program may be stored in a computer readable media such as a USB memory, a CD disk, or a flash memory to be read and executed by a computer to implement the exemplary embodiment of the present invention. The recording media of the computer program may include a magnetic recording medium, an optical recording medium, or a carrier wave medium.

All terms used herein including technical or scientific terms have the same meanings as meanings which are generally understood by those skilled in the art unless they are differently defined. Terms defined in generally used dictionary shall be construed that they have meanings matching those in the context of the related art, and shall not be construed in ideal or excessively formal meanings unless they are clearly defined in the present invention.

The above description is simply given for illustratively describing the technical spirit of the present invention, and those skilled in the art will appreciate that various modifications, changes and substitutions are possible, without departing from the essential characteristic of the present invention. Accordingly, the exemplary embodiment disclosed in the present invention and the accompanying drawings are not intended to limit but describe the technical spirit of the present invention, and the scope of the technical spirit of the present invention is not limited by the exemplary embodiment and the accompanying drawings. The scope of the present invention shall be interpreted by the appended claims and it shall be interpreted that all of the technical spirits in the equivalent range are included in the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A sound modulation apparatus, comprising:
   a sensor information input unit configured to receive sensing information on a position, at which a touch input of a user is applied to a screen, and a pressure of the touch input applied to the screen; and
   a sound modulation unit configured to set a tone frequency and volume of a sound to be output, and set the tone frequency according to the position, to which the touch input of the user is applied, and set the volume according to a size of the pressure of the touch input,
   wherein the sound modulation unit includes a volume controlling unit, which determines a reference pressure according to the pressure of the touch input at a predetermined reference time, and sets the volume according to a size of the determined reference pressure, and
   wherein the sound modulation unit further includes a frequency controlling unit, which sets the tone frequency according to the position, to which the touch input is applied, and changes the tone frequency according to a change in a size of the pressure of the touch input.

2. The sound modulation apparatus of claim 1, further comprising:
   the screen configured to display an image.

3. The sound modulation apparatus of claim 1, wherein the pressure sensor unit includes a sensing grid corresponding to a surface of the screen,
   detects and outputs the information on the position, at which the touch input of the user is applied to the screen, by using the sensing grid, and
   detects and outputs the information on the pressure at the position, to which the touch input of the user is applied, by using a pressure sensor provided in the sensing grid.

4. The sound modulation apparatus of claim 1, wherein the volume controlling unit determines the pressure of the touch input at the reference time as the reference pressure, in which the reference time is a time point after a predetermined time based on a time point, at which the size of the pressure of the touch input is increased to a predetermined size or more.

5. The sound modulation apparatus of claim 1, wherein the volume controlling unit determines the reference pressure by analyzing the pressure of the touch input during the predetermined reference time from a time point, at which a size of the pressure of the touch input is increased to a predetermined size or more.

6. The sound modulation apparatus of claim 4, wherein the sound modulation unit includes a setting unit which analyzes a pressure input for each time according to the touch input based on a time point, at which a size of the pressure of the touch input is increased to a predetermined size or more, and sets the reference time based on the analyzed pressure input.

7. The sound modulation apparatus of claim 1, wherein the frequency controlling unit increases or decreases the tone frequency within a predetermined frequency range based on the set tone frequency according to the change in the size of the pressure of the touch input.

8. The sound modulation apparatus of claim 7, wherein the frequency controlling unit repeatedly increases or decreases the tone frequency over time, within the predetermined frequency range based on the set tone frequency, according to the change in the size of the pressure of the touch input for vibrato of the sound to be output.

9. The sound modulation apparatus of claim 1, wherein the frequency controlling unit changes the set tone frequency according to the change in the size of the pressure after the predetermined reference time.

10. The sound modulation apparatus of claim 1, wherein when the size of the pressure is increased, the frequency controlling unit increases the tone frequency to be higher than the set tone frequency, and when the size of the pressure is decreased, the frequency controlling unit decreases the tone frequency to be lower than the set tone frequency.

11. The sound modulation apparatus of claim 1, wherein the sound modulation unit includes a multi-channel output ratio controlling unit, which recognizes a direction of the touch input by using the position, to which the touch input is applied, or the pressure of the touch input, and sets an output ratio between a plurality of channels, which are to output the sound, according to the recognized direction of the touch input.

12. The sound modulation apparatus of claim 11, wherein the multi-channel output ratio controlling unit recognizes the direction of the touch input by using information about a change in the position, to which the touch input is applied, or a change in a size of the pressure at the position.

13. The sound modulation apparatus of claim 11, wherein the multi-channel output ratio controlling unit calculates a component value for each reference direction by analyzing the recognized direction of the touch input, and sets an output ratio between the plurality of channels according to a predetermined setting value according to a size of the component value for each reference direction.

14. The sound modulation apparatus of claim 12, wherein the multi-channel output ratio controlling unit recognizes a direction of the touch input according to a direction of a movement of the position over time, to which the touch input is applied, or recognizes a direction of the touch input according to a direction, in which a distribution of sizes of the pressures at a plurality of sensing points according to the touch input is changed over time.

15. A sound modulation method, comprising:
a pressure sensing operation of receiving information including a detected position, at which a touch input of a user is applied to a screen, and a detected pressure of the touch input applied to the screen by using a pressure sensor;
a volume setting operation of setting, by a sound modulation unit, a volume of a sound to be output according to a size of the pressure of the touch input; and
a frequency setting operation of setting, by the sound modulation unit, a tone frequency of the sound according to the position, to which the touch input is applied, wherein in the volume setting operation, a recognized pressure is determined according to the pressure of the touch input at a predetermined recognition time, and the volume is set according to a size of the determined recognized pressure, and
wherein in the frequency setting operation, the tone frequency is set according to the position, to which the touch input is applied, and the tone frequency is changed according to a change in a size of the pressure of the touch input.

16. The sound modulation method of claim 15, wherein the sound modulation unit further includes a multi-channel output ratio controlling operation of recognizing a direction of the touch input by using the position, to which the touch input is applied, or the pressure of the touch input, and setting an output ratio between a plurality of channels, which are to output the sound, according to the recognized direction of the touch input.

17. The sound modulation apparatus of claim 1, wherein when the user touches the position of the touch input after the reference time, the sound modulation unit changes the tone frequency according to a change in a size of the touch input continuously applied to the position of the touch input.

18. The sound modulation method of claim 15, wherein when the user touches the position of the touch input after the recognition time during the frequency setting operation, the tone frequency is changed according to a change in a size of the pressure of the touch input continuously applied to the position.

19. A sound modulation apparatus, comprising:
a sensor information input unit configured to receive sensing information on a position at which a touch input of a user is applied to a screen, and a pressure of the touch input applied to the screen; and
a sound modulation unit configured to set a tone frequency and volume of a sound to be output, to set the tone frequency according to the position to which the touch input of the user is applied, and to set the volume according to a size of the pressure of the touch input,
wherein the sound modulation unit includes a volume controlling unit, which determines a reference pressure according to the pressure of the touch input at a predetermined reference time, and sets the volume according to a size of the determined reference pressure,
wherein the volume controlling unit determines the pressure of the touch input at the reference time as the reference pressure, and
wherein the reference time is a time point after the size of the pressure of the touch input is increased to a predetermined size or more.

* * * * *